United States Patent
Holzinger et al.

(10) Patent No.: US 8,541,969 B2
(45) Date of Patent: Sep. 24, 2013

(54) METHOD AND DEVICE FOR PULSE WIDTH MODULATED ACTIVATION OF AN ELECTRICAL DRIVE MOTOR OF AN ADJUSTMENT ARRANGEMENT

(75) Inventors: Stefan Holzinger, Vienna (AT); Roman Morawek, Vienna (AT); Daniel Zuffer, Hörersdorf (AT)

(73) Assignee: Continental Automotive GmbH, Hannover (DE)

(*) Notice: Subject to any disclaimer, the term of this patent is extended or adjusted under 35 U.S.C. 154(b) by 198 days.

(21) Appl. No.: 13/201,009

(22) PCT Filed: Jan. 28, 2010

(86) PCT No.: PCT/EP2010/051006
§ 371 (c)(1),
(2), (4) Date: Sep. 26, 2011

(87) PCT Pub. No.: WO2010/091962
PCT Pub. Date: Aug. 19, 2010

(65) Prior Publication Data
US 2012/0001585 A1 Jan. 5, 2012

(30) Foreign Application Priority Data
Feb. 11, 2009 (DE) .................. 10 2009 008 369

(51) Int. Cl.
*H02P 3/00* (2006.01)

(52) U.S. Cl.
USPC ........... 318/468; 318/599; 318/280; 318/700; 318/400.01; 318/461; 318/286; 318/369; 318/715; 318/717; 318/719; 318/400.27; 318/400.16; 318/400.15; 318/400.12

(58) Field of Classification Search
USPC .................... 318/599, 280, 700, 400.01, 468, 318/461, 286, 369, 715, 717, 719, 400.27, 318/400.16, 400.15, 400.12, 265
See application file for complete search history.

(56) References Cited

U.S. PATENT DOCUMENTS

| | | | | |
|---|---|---|---|---|
| 5,734,245 A | * | 3/1998 | Terashima et al. | 318/453 |
| 6,806,664 B2 | * | 10/2004 | Beishline | 318/280 |
| 6,870,339 B2 | * | 3/2005 | Kessler et al. | 318/468 |

(Continued)

FOREIGN PATENT DOCUMENTS

| | | |
|---|---|---|
| DE | 4214998 A1 | 11/1993 |
| DE | 19633941 A1 | 2/1998 |

(Continued)

OTHER PUBLICATIONS

International PCT Search Report and Written Opinion, PCT/EP2010/051006, 16 pages, Jun. 7, 2010.

*Primary Examiner* — Rita Leykin
(74) *Attorney, Agent, or Firm* — King & Spalding L.L.P.

(57) ABSTRACT

In a method and a device for pulse width modulated (PWM-) activation of an electrical drive motor (2) of an adjustment arrangement based on a reference of the mechanical system of the adjustment arrangement that corresponds to a relationship between the force (F) on the drive motor (2) and the adjustment path (s) or the adjustment time (t) of the adjustment arrangement stored in a memory (9), an anticipated future force value (F(t+t0)) is determined based on the reference of the mechanical system in order to adjust the PWM activation in advance by utilizing this future force value such that motor synchronization fluctuations can be prevented upon anticipated mechanical fluctuations in the adjustment arrangement.

21 Claims, 2 Drawing Sheets

(56) References Cited

U.S. PATENT DOCUMENTS

| | | | |
|---|---|---|---|
| 6,940,246 B2 * | 9/2005 | Mochizuki et al. | 318/469 |
| 7,038,414 B2 * | 5/2006 | Daniels et al. | 318/466 |
| 7,067,996 B2 * | 6/2006 | Yamamoto | 318/55 |
| 7,161,320 B2 * | 1/2007 | Shimizu et al. | 318/461 |
| 7,667,425 B2 | 2/2010 | Sommer | 318/700 |
| 7,701,157 B2 * | 4/2010 | Shimomura et al. | 318/265 |
| 7,834,570 B2 * | 11/2010 | Lendi | 318/466 |
| 8,089,230 B2 * | 1/2012 | Fuchs et al. | 318/286 |
| 2006/0197481 A1 | 9/2006 | Hotto et al. | 318/280 |

FOREIGN PATENT DOCUMENTS

| | | |
|---|---|---|
| DE | 19700828 A1 | 7/1998 |
| EP | 1299782 | 4/2003 |
| EP | 1602014 | 12/2005 |
| WO | 02/06615 A2 | 1/2002 |
| WO | 2004/081681 A1 | 9/2004 |

* cited by examiner

METHOD AND DEVICE FOR PULSE WIDTH MODULATED ACTIVATION OF AN ELECTRICAL DRIVE MOTOR OF AN ADJUSTMENT ARRANGEMENT

CROSS-REFERENCE TO RELATED APPLICATIONS

This application is a U.S. National Stage Application of International Application No. PCT/EP2010/051006 filed Jan. 28, 2010, which designates the United States of America, and claims priority to German Application No. 10 2009 008 369.3 filed Feb. 11, 2009, the contents of which are hereby incorporated by reference in their entirety.

TECHNICAL FIELD

The invention relates to a method and a device for pulse width modulated (PWM) activation of an electrical drive motor of an adjustment arrangement on the basis of a reference, stored in a memory, of the mechanical system of the adjustment apparatus, said reference corresponding to a relationship between the force at the motor and the adjustment path or the adjustment time of the adjustment arrangement.

BACKGROUND

Adjustment arrangements such as those in question here are used, for example in motor vehicles, for driving electrical window winders or sunroofs, but other applications are also possible, such as electrical tailgates, sliding doors, etc. In order to increase the convenience in use and safety, pulse width modulated motor activation is often used in connection with such adjustment arrangements, said pulse width modulated motor activation being intended to ensure synchronized operation of the motor even when there are fluctuations in the on-board system voltage, generally in the supply voltage. Such PWM activation is also advantageous in conjunction with conventional anti-trap systems.

Specifically, closed-loop control of the adjustment speed is also enabled with such PWM activation means, in addition to synchronized operation of the motor being ensured, in the event of fluctuations in the supply voltage, in order to provide increased allowed reaction time by virtue of slower closing speeds, for example, and similar advantages for an anti-trap system. This is particularly relevant in the 25 mm range of the FMVSS 118 guideline, in accordance with which anti-trap systems with a spring rate of 65 N/mm are tested. In particular, even when a sliding roof is closed, for example, the closing speed can be reduced prior to said sliding roof entering the seal, with energy being taken from the moved mechanical system. In the ideal case, it is possible in this way to dispense with a mechanical damping element.

In the known technologies, electronic controllers are used for this purpose, said controllers calculating the required duty factor by measuring the on-board system voltage of the motor vehicle in order to make available the desired motor voltage (for example 70% of the on-board system voltage in specific time intervals). If appropriate, the motor voltage can then be checked, i.e. measured back, with the result that a closed control loop is produced. In this way, on-board voltage fluctuations can be corrected. However, fluctuations in the synchronized operation of the respective adjustment arrangement, for example a window winder or a sliding roof, still occur, with these fluctuations in the synchronized operation resulting from different mechanical loads, in particular as a result of the different component parts which engage or become disengaged in the course of an adjustment movement depending on the position (or time) in the mechanical system. These fluctuations in the synchronized operation as a result of varying mechanical forces are not corrected in the known systems since fluctuations in the synchronized operation represent the input or measurement signal of the anti-trap algorithm. As a result, the convenience for the user is reduced and the advantages of the PWM activation for the anti-trap system are reduced.

SUMMARY

According to various embodiments, a remedy can be provided to this and to eliminate fluctuations in the synchronized operation as a result of varying mechanical loads as well as possible in order thus to increase the convenience for the users and to ensure the advantages of the PWM activation in respect of an anti-trap system even for such cases of varying mechanical loads.

According to an embodiment, in a method for pulse width modulated activation of an electrical drive motor of an adjustment arrangement on the basis of a reference, stored in a memory, of the mechanical system of the adjustment arrangement, said reference corresponding to a relationship between the force at the drive motor and the adjustment path or the adjustment time of the adjustment arrangement, an expected future force value is determined on the basis of the reference of the mechanical system in order to set the PWM activation in advance using this future force value in such a way that, in the event of expected mechanical fluctuations, of the adjustment arrangement, fluctuations in the synchronized operation of the motor are avoided.

According to a further embodiment, at a time, an expected future force, in a time interval, can be calculated and the motor voltage to be set with the aid of the PWM activation is determined taking into consideration the desired motor angular velocity on the basis of the relationship $U_{Mot}=k_1*F+k_2*\omega$, where $U_{Mot}$ is the measured motor voltage, $\omega$ is the measured motor angular velocity, and $k_1$ and $k_2$ are system constants which can be determined empirically. According to a further embodiment, the time interval can be of the order of magnitude of the dead time of the closed-loop control system formed by the PWM activation. According to a further embodiment, the time interval can be selected to be between 1 and 5 ms, preferably equal to approximately 2.5 ms. According to a further embodiment, the supply voltage of the drive motor can be measured and, depending thereon and on the basis of the motor voltage to be set, the duty factor on which the PWM activation is based is calculated. According to a further embodiment, the PWM activation can be used in conjunction with an anti-trap system. According to a further embodiment, the PWM activation can be activated using the future force value after soft runup of the drive motor.

According to another embodiment, an apparatus for PWM activation of an electrical drive motor of an adjustment arrangement on the basis of a reference, stored in a memory, of the mechanical system of the adjustment arrangement, which reference corresponds to a relationship between the force at the drive motor and the adjustment path or the adjustment time of the adjustment arrangement, may comprise computation means, which are designed to determine an expected future force value on the basis of the reference of the mechanical system and to set the PWM activation in advance using said future force value in such a way that, in the event of expected mechanical fluctuations in the adjustment arrangement, fluctuations in the synchronized operation of the motor are avoided.

According to a further embodiment of the apparatus, the computation means can be designed to calculate an expected future force in a time interval at a time and the motor voltage to be set with the aid of the PWM actuation means is determined taking into consideration the desired motor angular velocity ω on the basis of the relationship $U_{Mot}=k_1*F+k_2*\omega$, where $U_{Mot}$ is the measured motor voltage, ω is the measured motor angular velocity, and $k_1$ and $k_2$ are system constants which can be determined empirically. According to a further embodiment of the apparatus, the time interval can be of the order of magnitude of the dead time of the closed-loop control system formed by the PWM activation means. According to a further embodiment of the apparatus, the apparatus may comprise measurement means for measuring the supply voltage of the drive motor and in that the computation means are further designed to calculate the duty factor on which the PWM activation is based on the basis of the motor voltage to be set and the measured supply voltage. According to a further embodiment of the apparatus, the PWM activation means can be connected to an anti-trap system.

BRIEF DESCRIPTION OF THE DRAWINGS

The invention will be explained below with reference to exemplary embodiments, to which said invention is not intended to be restricted, however, and with reference to the drawing, in which.

DETAILED DESCRIPTION

Figure 1:
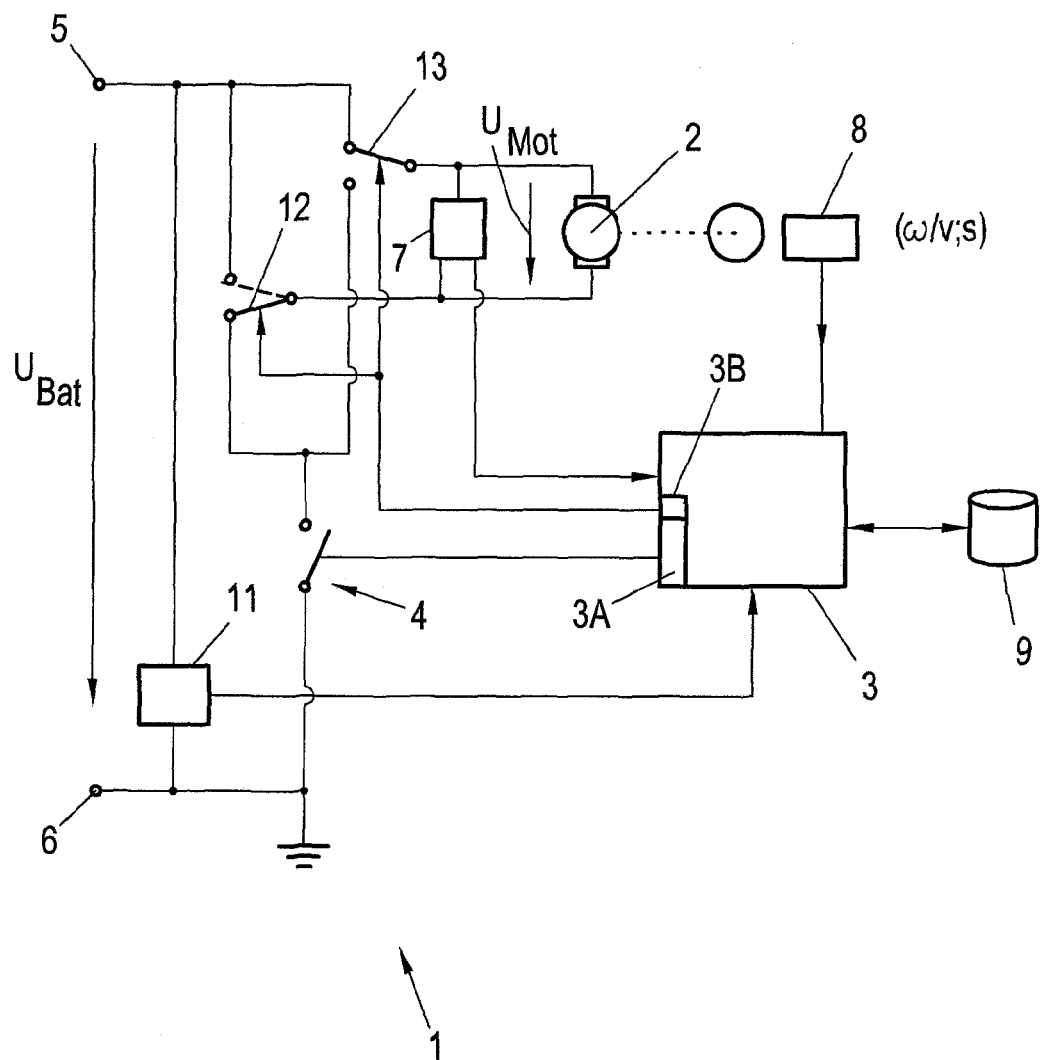
FIG. 1 shows a block circuit diagram of an embodiment of the device.

According to various embodiments, the various embodiments are based on the fact that generally, in particular in connection with anti-trap systems as are generally provided in the case of window winders, sliding roofs, etc., a reference of the mechanical system is stored in the memory of the control electronics (see, for example, DE 196 33 941 C2). This reference of the mechanical system can also be referred to as a characteristic, reference field or mechanical characteristic and generally comprises a data field, wherein values for the force at the motor are provided depending on the position of the adjustment arrangement, i.e. for example in particular a window or sliding roof, or on the time during operation of the adjustment arrangement. This reference, also referred to as characteristic for short below, is determined empirically and stored for each individual mechanical system in the course of the initialization during manufacture of the motor vehicle. The various embodiments are now based on the principle of it being possible to use this mechanical characteristic to adjust the respective PWM closed-loop control or PWM motor activation in advance in such a way that any mechanical fluctuations to be expected do not result in fluctuations in the synchronized operation of the motor.

In accordance with the present technology, an expected future force value is thus determined on the basis of the mechanical characteristic, i.e. the reference of the mechanical system of the adjustment arrangement, and the PWM activation is then set in advance using this future force value in such a way that, in the event of expected mechanical fluctuations in the adjustment arrangement, fluctuations in the synchronized operation of the motor can be avoided by the modified PWM activation. This can be brought about in an advantageous and simple manner by virtue of the fact that, at a time t, an expected future force F $(t+t_0)$, in a time interval $t_0$, is calculated and the motor voltage $U_{Mot}$ to be set with the aid of the PWM activation is determined taking into consideration the desired motor angular velocity ω on the basis of the relationship $U_{Mot}=k_1*F+k_2*\omega$, where $U_{Mot}$ is the motor voltage, ω is the motor angular velocity and $k_1$ and $k_2$ are system constants which can be determined empirically. In this case, the time interval $t_0$ advantageously corresponds to the dead time of the closed-loop control system and is in particular 1 to 5 ms, wherein time intervals of approximately 2.5 ms have proven to be particularly advantageous in tests (specifically the time interval $t_0$ is of course dependent on the system). It is then possible for the supply voltage, i.e. in particular the on-board system voltage or battery voltage, in the case of motor vehicles, to be measured and for the duty factor on which the PWM activation is based to be calculated depending on the measured value of this supply voltage and the determined motor voltage to be set.

In order to enable problem-free starting, it is also advantageous if the PWM activation is activated using the future force value only after soft runup of the drive motor.

A less favorable alternative corresponding to the prior art would be to measure the actual speed of the motor, which is available via the Hall sensors, and to perform closed-loop control to the desired setpoint speed using this actual speed. However, this would have the disadvantage that an object becoming trapped, which would result in a reduction in speed, would cause an increase in the motor voltage. This would also additionally increase the clamping force on the object, which is naturally disadvantageous. The technical solution proposed here advantageously performs closed-loop control with a previously recorded mechanical characteristic instead of with the aid of the actual speed, however. This means that a trapped object does not result in an increase in the motor clamping voltage, as a result of which the clamping force on the object is not increased, unnecessarily, either.

Preferably, the PWM motor activation is therefore used in conjunction with an anti-trap system with a configuration known per se, wherein additional safety can be achieved in terms of the function of the anti-trap system as a result of the available technology of avoiding fluctuations in synchronized operation.

FIG. 1 shows a schematic of a block circuit diagram of a device 1 for PWM activation of an electric motor 2 of an adjustment arrangement which is moreover not illustrated in any further detail, wherein central computation means 3 (CPU 3) are provided as an essential component of the device 1 for implementing PWM activation of the motor 2 via a PWM switch 4; this PWM switch 4 is illustrated only schematically in FIG. 1 and is implemented in practice generally with the aid of a field effect transistor (FET), for example. The PWM switch 4 applies a supply voltage $U_{Bat}$ to the motor 2 corresponding to a duty factor predetermined by the computation means 3, said supply voltage being present at terminals

5, 6 of the device 1. The voltage $U_{Mot}$ actually present at the motor 2 is optionally measured with the aid of measurement means 7, the corresponding measured values being supplied to the computation means 3. Furthermore, in the example illustrated, a sensor 8 for measuring the rotary movement, namely in respect of the detection of the position, velocity or angular velocity and/or force of the motor 2, is provided; this sensor can be provided in addition or instead of the measurement means 7 for forming a closed-loop control system and may be a Hall sensor, for example. The output signal (measured signal) of the sensor 8 is likewise supplied to the computation means 3. Furthermore, the computation means 3 are connected to a memory 9, in which data relating to the mechanical characteristic of the respective adjustment arrangement or the mechanical system of this adjustment arrangement are stored. A possible characteristic F(t) is illustrated by way of example in FIG. 2 by the curve 10, which shows how the force F(t) at the motor changes as a function of time t or of the position of a sliding roof, for example (i.e. of the displacement path s). This force F which changes with the displacement path is therefore known to the device 1.

It is therefore apparent from FIG. 1 that measurement means are also provided for measuring the supply voltage $U_{Bat}$, wherein the measured values are likewise supplied to the computation means 3. The computation means 3 now implement PWM activation means for the motor 2, in a manner conventional per se, said PWM activation means being implemented specifically by a PWM module 3A in FIG. 1 in combination with the PWM switch 4. In conjunction therewith, there is an anti-trap system indicated by a module 3B in the computation means 3, with switching relays 12, 13 belonging to said anti-trap system as well in order to be able to reverse the motor 2 once the motor velocity has been reduced in the event of the identification of a trapping event, as is known per se.

The switching relays 12, 13 are shown in FIG. 1 in one of their normal operating positions, wherein they both change switching position as the motor 2 reverses. In the rest position (not shown), the two switching relays 12, 13 assume their upper position in FIG. 1, i.e. they are then both positioned at the terminal 5, as is indicated in FIG. 1 with the dashed line for the switching relay 12. The PWM switch 4 is open in the rest position.

As a development of the embodiment shown, it is also conceivable, for example, for a full bridge with four FETs to be provided instead of the switching relays 12, 13 and the PWM switch (FET) 4, said four FETs being activated by the computation means 3 via the (then combined) modules 3A, 3B in order to implement firstly the PWM activation and secondly the motor reversing.

The illustration in FIG. 1 shows that the supply voltage $U_{Bat}$, optionally the motor voltage $U_{Mot}$ and the motor speed co can be considered to be predetermined variables, i.e. said variables are measured and there is a response to said variables. This reaction relates to the PWM activation, wherein the motor voltage $U_{Mot}$ is set by the PWM module 3A and the PWM switch 4.

Specifically, physical circumstances define the relationship between the voltage $U_{Mot}$ at the motor, the force F at the motor and the angular velocity co of the motor, as follows:

The steady-state motor equation $$U_{Mot} = k_\omega \cdot \omega + R \cdot I$$

results in $$I = \frac{U_{Mot} - k_\omega \cdot}{R}$$

wherein:
I . . . is the motor current (armature current) of the motor 2
$k_{107}$ . . . is the proportionality factor (motor constant)
R . . . is the armature resistance.

If a further motor constant $k_m$ is predetermined as proportionality factor, the torque M of the motor is proportional to the armature current I over this constant $k_m$:

$$M = k_m \cdot I = \frac{k_m}{R}(U_{Mot} - k_\omega \cdot \omega)$$

The force F on the Bowden wire and therefore on the sliding roof etc. is given by the radius r of the cable winding of the motor and the respectively given transformation ratio ü, as follows:

$$F = \frac{\ddot{u}}{r}M = \frac{\ddot{u} \cdot k_m}{r \cdot R}(U_{Mot} - k_\omega \cdot \omega)$$

The following relationship between the motor voltage $U_{Mot}$, the force F and the angular velocity ω thus results:

$$U_{Mot} = F\frac{r \cdot R}{\ddot{u} \cdot k_m} + k_\omega \cdot = k_1 \cdot F + k_2 \cdot,$$

wherein, in this equation, only known system constants $k_1$, $k_2$ arise in addition to the mentioned variables.

Figure 2:
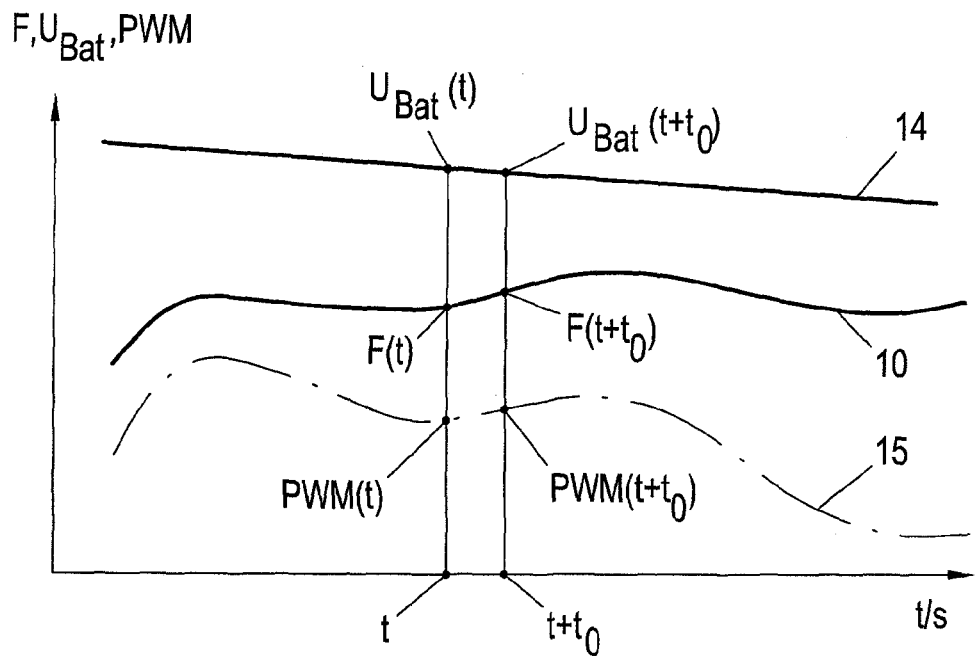
FIG. 2 shows a graph of the profile of the force F at the motor, the supply voltage $U_{Bat}$ and the PWM function over time t (or over the position or the displacement path s)

The expected future force $F(t+t_0)$ is now calculated with the aid of the mechanical characteristic F(t) (see FIG. 2). The motor voltage $U_{Mot}$ to be set is therefore given together with the desired rotation speed ω in accordance with the above equation. The time interval $t_0$ in this case advantageously corresponds to the dead time of the closed-loop control system.

With the aid of the measured on-board voltage $U_{Bat}$ it is then possible to directly calculate the duty factor x at which the PWM control needs to be set:

$$x = 100 \cdot U_{Mot}/U_{Bat}\%.$$

It also follows from the above relationship that the closed-loop velocity control is strictly speaking no longer closed-loop control, but the velocity v is merely set. The control loop is only closed by the correct calculation of the expected future force $F(t+t_0)$, in which the calculation of the present force is also included, with this in turn being based on the present rotation speed since the stored mechanical characteristics only describe differential forces.

This fact results in a further advantage of the present concept: in the event of an object being trapped, the rotation speed of the motor will drop, which would result in an increase in the motor voltage $U_{Mot}$ with direct closed-loop control. However, in the event of trapping, this is extremely undesirable since the trapping would be further intensified thereby. In the proposed concept, this is avoided since the potentially present trapping operation is not included in the calculation of the force $F(t+t_0)$ expected in the future since said trapping operation is not depicted in the characteristic.

The present device, with the specific PWM activation, can therefore be connected with otherwise conventional anti-trap systems in a particularly advantageous manner.

By way of an exemplary illustration, in addition to the force characteristic F(t), a curve 14 for the supply voltage $U_{Bat}$ (t) and a curve 15 for the PWM function are also illustrated in the graph shown in FIG. 2. It has furthermore been shown that the force $F(t+t_0)$ is determined at a time t in the form of a prediction for time $t+t_0$, and since the force F at this future time $t+t_0$ is substantially different than that at time t, a substantially modified PWM also takes place.

The time interval $t_0$ is 1 to 5 ms, for example, in particular approximately 2.5 ms.

Figure 3:
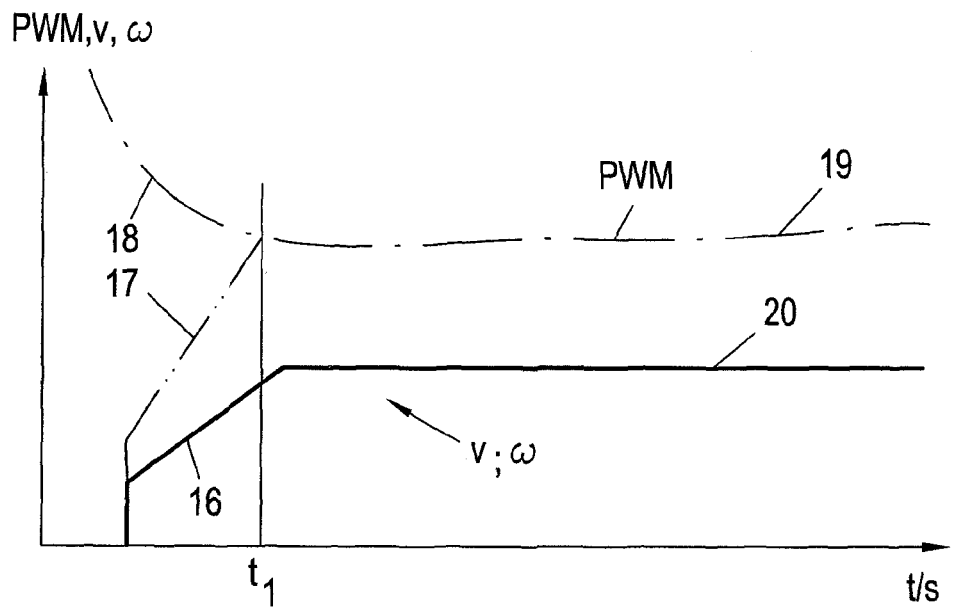
FIG. 3 shows a graph of a PWM function and a velocity curve v over time t (or over the displacement path s) for illustrating a transition from a runup mode to the PWM activation mode in accordance with the technology according to various embodiments.

FIG. 3 illustrates a schematic of an example of the runup phase of the present controller, wherein, after starting at a time $t_0$, the adjustment arrangement is operated in a conventional manner, with conventional ramps 16 or 17 for the velocity curve v (or the motor angular velocity ω) and for the PWM curve being provided. In this phase, the closed-loop PWM control which would result owing to the present technology and which is shown in a curved section 18 in FIG. 3 follows "without effect". From the transition time $t_1$ onwards, the above-described technology is used for the PWM activation, with the resultant PWM curve 19 and the velocity curve 20 resulting, for example. The velocity v is in this case in a direct relationship with the motor angular velocity ω or the motor rotation speed, which is indicated in FIG. 3 by the additional reference to "ω".

As mentioned, the present technology can be used with particular advantages when driving sliding roofs, in the case of window winders, and also in the case of sliding doors, electrically operated tailgates, etc., wherein in particular advantages are achieved when these known devices are also equipped with an anti-trap system.

The various system constants are expediently determined empirically in a simple manner the first time the system is brought into operation, during the course of initialization of the system, and then stored, along with the mechanical characteristic, in storage means, for example the memory 9. However, it is also possible, for example, for a general characteristic to be used as the basis, with the system being matched to said characteristic successively.

The invention claimed is:

1. A method for pulse width modulated activation of an electrical drive motor of an adjustment arrangement on the basis of a reference, stored in a memory, of the mechanical system of the adjustment arrangement, said reference corresponding to a relationship between the force at the drive motor and the adjustment path or the adjustment time of the adjustment arrangement, the method comprising:
    determining an expected future force value on the basis of the reference of the mechanical system in order to set the PWM activation in advance using this future force value in such a way that, in the event of expected mechanical fluctuations, of the adjustment arrangement, fluctuations in the synchronized operation of the motor are avoided.

2. The method according to claim 1, wherein at a time, an expected future force, in a time interval, is calculated and the motor voltage to be set with the aid of the PWM activation is determined taking into consideration the desired motor angular velocity on the basis of the relationship $U_{mot}=k_1*F+k_2*\omega$, where
    $U_{mot}$ is the measured motor voltage,
    ω is the measured motor angular velocity, and
    $k_1$ and $k_2$ are system constants which can be determined empirically.

3. The method according to claim 2, wherein the time interval is of the order of magnitude of the dead time of the closed-loop control system formed by the PWM activation.

4. The method according to claim 2, wherein the time interval is selected to be between 1 and 5 ms.

5. The method according to claim 1, wherein the supply voltage of the drive motor is measured and, depending thereon and on the basis of the motor voltage to be set, the duty factor on which the PWM activation is based is calculated.

6. The method according to claim 1, wherein the PWM activation is used in conjunction with an anti-trap system.

7. The method according to claim 1, wherein the PWM activation is activated using the future force value after soft runup of the drive motor.

8. An apparatus for PWM activation of an electrical drive motor of an adjustment arrangement on the basis of a reference, stored in a memory, of the mechanical system of the adjustment arrangement, which reference corresponds to a relationship between the force at the drive motor and the adjustment path or the adjustment time of the adjustment arrangement, the apparatus comprising:
    computation means, which are designed to determine an expected future force value on the basis of the reference of the mechanical system and to set the PWM activation in advance using said future force value in such a way that, in the event of expected mechanical fluctuations in the adjustment arrangement, fluctuations in the synchronized operation of the motor are avoided.

9. The apparatus according to claim 8, wherein the computation means are designed to calculate an expected future force in a time interval at a time and the motor voltage to be set with the aid of the PWM actuation means is determined taking into consideration the desired motor angular velocity co on the basis of the relationship $U_{mot}=k_1*F+k_2*\omega$, where
    $U_{mot}$ is the measured motor voltage,
    ω is the measured motor angular velocity, and
    $k_1$ and $k_2$ are system constants which can be determined empirically.

10. The apparatus according to claim 9, wherein the time interval is of the order of magnitude of the dead time of the closed-loop control system formed by the PWM activation means.

11. The apparatus according to claim 8, further comprising measurement means for measuring the supply voltage of the drive motor wherein the computation means are further designed to calculate the duty factor on which the PWM activation is based on the basis of the motor voltage to be set and the measured supply voltage.

12. The apparatus according to claim 8, wherein the PWM activation means are connected to an anti-trap system.

13. A system for pulse width modulated activation of an electrical drive motor of an adjustment arrangement on the basis of a reference, stored in a memory, of the mechanical system of the adjustment arrangement, said reference corresponding to a relationship between the force at the drive motor and the adjustment path or the adjustment time of the adjustment arrangement, comprising a processor programmed to determine an expected future force value on the basis of the reference of the mechanical system in order to set the PWM activation in advance using this future force value in such a way that, in the event of expected mechanical fluctuations, of the adjustment arrangement, fluctuations in the synchronized operation of the motor are avoided.

14. The system according to claim 12, wherein at a time, an expected future force, in a time interval, is calculated by the processor and the motor voltage to be set with the aid of the PWM activation is determined taking into consideration the desired motor angular velocity on the basis of the relationship $U_{mot}=k_1*F+k_2*\omega$, where $U_{mot}$ is the measured motor voltage, $\omega$ is the measured motor angular velocity, and $k_1$ and $k_2$ are system constants which can be determined empirically.

15. The system according to claim 13, wherein the time interval is of the order of magnitude of the dead time of the closed-loop control system formed by the PWM activation.

16. The system according to claim 13, wherein the time interval is selected to be between 1 and 5 ms.

17. The system according to claim 12, wherein the supply voltage of the drive motor is measured and, depending thereon and on the basis of the motor voltage to be set, the duty factor on which the PWM activation is based is calculated by the processor.

18. The system according to claim 12, wherein the PWM activation is used in conjunction with an anti-trap system.

19. The system according to claim 12, wherein the PWM activation is activated using the future force value after soft runup of the drive motor.

20. The system according to claim 13, wherein the time interval is approximately 2.5 ms.

21. The method according to claim 2, wherein the time interval is approximately 2.5 ms.

* * * * *